United States Patent [19]

Abe

[11] Patent Number: 4,492,818

[45] Date of Patent: Jan. 8, 1985

[54] TABLET INPUT APPARATUS

[75] Inventor: Kiyomi Abe, Soka, Japan

[73] Assignee: Pentel Kabushiki Kaisha, Tokyo, Japan

[21] Appl. No.: 441,779

[22] Filed: Nov. 15, 1982

[30] Foreign Application Priority Data

Nov. 14, 1981 [JP] Japan ............................. 56-182682

[51] Int. Cl.³ ............................................. G08C 21/00
[52] U.S. Cl. ................................................... 178/18
[58] Field of Search ...................... 178/18, 19, 17 C; 340/365 S, 365 VL, 365 E, 365 C, 712

[56] References Cited

U.S. PATENT DOCUMENTS 3,974,332  8/1976  Abe et al. ............................... 178/18

Primary Examiner—Stafford D. Schreyer
Attorney, Agent, or Firm—Robert E. Burns; Emmanuel J. Lobato; Bruce L. Adams

[57] ABSTRACT

A tablet input apparatus having a tablet formed with a segment including at least one lattice point on a matrix comprising a group of conductors arranged in spaced relation along coordinate axes, wherein an input pen is placed in contact with a desired segment to thereby output said segment as a coordinate data. In the tablet input apparatus, when a scanning pulse supplied to adjacent at least two conductors is detected by one-time contacting operation of the input pen, the coordinate data is discriminated by either scanning pulse or no discriminating operation is made therefor but processing is made to provide a non-detection zone.

3 Claims, 7 Drawing Figures

TABLET INPUT APPARATUS

FIELD AND BACKGROUND OF THE INVENTION

The present invention relates to a tablet input apparatus having a tablet in which a segment including at least one lattice point is formed on a matrix comprising a group of conductors arranged in spaced relation along coordinate axes, wherein an input pen is placed in contact with a desired segment of said tablet to put out said segment as coordinate data, and more specifically, to a tablet input apparatus which is free of erroneous operation or incapability of detection in the event that an input pen is placed in contact with a segment having more than two lattice points.

Tablets internally provided with lattices of parallel conductors in regularly spaced relation along coordinate axes are described, for example, in U.S. Pat. No. 3,567,859 and U.S. Pat. No. 3,732,369. In these tablets, one set of a group of conductors are sequentially electrically pulsated and the other set of a group of conductors are then pulsated. An input pen having a tip formed as a conductor is placed in contact with said tablet to provide capacitive coupling at two sets of conductor lattice points. Thereby, a signal at the input pen from the pulsated conductor is used to digitalize the coordinate of a position of the pen in the surface of the tablet. By this operation, the position of the pen along one coordinate is digitalized, after which the other coordinate position is digitalized. The tablets of these U.S. Patents are designed for the purpose of inputting a handwritten figure into a computer, and therefore, the spacing between two sets of a group of conductors is very narrow thereby improving the resolution of the locus of the input pen.

However, recently, there is proposed an arrangement wherein an information sheet of a tablet is divided into segments, and reference symbols peculiar to each segment are assigned thereto, which tablet is used as a key board, as disclosed, for example, in U.S. Pat. Nos. 3,974,332 or 4,136,336. In these tablets or key boards, the segment indicates one "key" region, which substantially functions to form a digital signal representative of one coordinate position. Accordingly, in said arrangement, the locus of a pen is not converted into a series of digital signals but a position of the pen which moves at random from one segment to the other may be digitalized separately and independently. Therefore, unlike the tablet for inputting of a figure as described above, the spacing between two sets of a group of conductors can be made wide, and also the width of each conductor can be made wide. In these tablets, there is no limitation peculiar to the segments thereof, that is, the number of keys, and therefore, the tablets are suitably used for the purpose of inputting information having many kinds, for example, Japanese or Chinese, into a computer. Furthermore, in case a stock of several thousands of parts or chemicals is controlled by a computer, the aforesaid tablet is extremely advantageously used to input codes of such parts.

The above-described tablet input device comprises a first scanning unit for sequentially applying a scanning pulse to a group of conductors in an X axis of coordinate axes and a second scanning unit for sequentially applying a scanning pulse to a group of conductors in a Y axis, wherein an input pen provides an output signal every time a scanning pulse is applied to a conductor in a segment with which the input pen is placed in contact. The tablet input device comprises a counter for counting scanning pulses and the value counted by the counter indicates the coordinate of a key segment with which the input pen is placed in contact. The scanning pulses are supplied two by two periods from each of scanning units in order to obtain accurate discrimination and to remove influences caused by external noises or the like to enhance reliability of data input. Thus, a first detection signal obtained by the first scanning pulse is applied as a latch strobe signal to a latch circuit, and the value counted by the counter at that time is stored. On the other hand, a second detection signal obtained by the second scanning pulse is applied as a comparing strobe signal to a comparison circuit. The comparison circuit compares the value counted by the counter with a data latched by the latch circuit at timing the comparing strobe signal is input, and when they coincide with each other, the data of the latch circuit is output as a coordinate data to the information processing apparatus.

In such tablet input apparatus, it is sometimes required that an area of some segment is increased to display functions, phrases, etc. thereon in order that information displayed on the information sheet on the tablet may be seen easily. In this case, one enlarged segment includes more than two lattice points and when the input pen is placed in contact with a central portion of the enlarged segment, the tip of the input pen becomes positioned in the central portion between the lattices. Therefore, the input pen provides an output signal every time scanning pulses are applied to two conductors adjacent to the input pen and a first and a second detection signals are obtained by the application of the first scanning pulse. However, the first detection signal is different from the second detection signal in the value counted by the counter, no coincidence is attained by the comparison circuit and the coordinate data is impossible to be put out, resulting in formation of a so-called non-detection zone.

SUMMARY OF THE INVENTION

It is therefore an object of the present invention to provide a tablet input apparatus which is free from erroneous operation or incapability of detection even when an input pen is placed in contact with a segment having more than two lattice points.

It is another object of the present invention to provide a tablet input apparatus which is operable so that when an input pen is brought into contact with a segment having more than two lattice points, the data of said segment is not output or data is not output with said segment as a non-detection zone.

In accordance with the present invention, there is provided the aforementioned tablet input apparatus which comprises a tablet comprising a matrix comprising two sets of a group of conductors arranged in spaced relation along coordinate axes and a segment including at least one of lattice points of said matrix, said segment being, as a separate key, associated with a symbol representative of said key; a pair of scanning units respectively connected to said two sets of a group of conductors to sequentially supply scanning pulses to said each set of a group of conductors; an input pen for detecting said scanning pulses from the desired said segment of said tablet; and a control circuit for supplying a control signal to each of said pair of scanning units and receiving an output signal of said input pen thereby to specify said segment selected by said input pen to output a coordinate data signal; said control circuit comprises a distribution control circuit in which when said input pen is placed in contact with a segment having at least two lattice points to detect scanning pulses supplied to at least two said conductors adjacent to said input pen, either one of scanning pulse is not supplied to said control circuit.

In a preferred embodiment of the present invention, said distribution control circuit comprises a manual switch, said switch being changed over so that scanning pulses detected from two conductors adjacent to an input pen are that either one of scanning pulses is not supplied to the control circuit or any scanning pulse is not supplied to the control circuit. Thereby, the coordinate data of the segment having more than two lattice points is accurately discriminated or the coordinate data of such segment is not output but said segment may be set as a non-detection zone.

DESCRIPTION OF THE PREFERRED EMBODIMENTS

Figure 1:
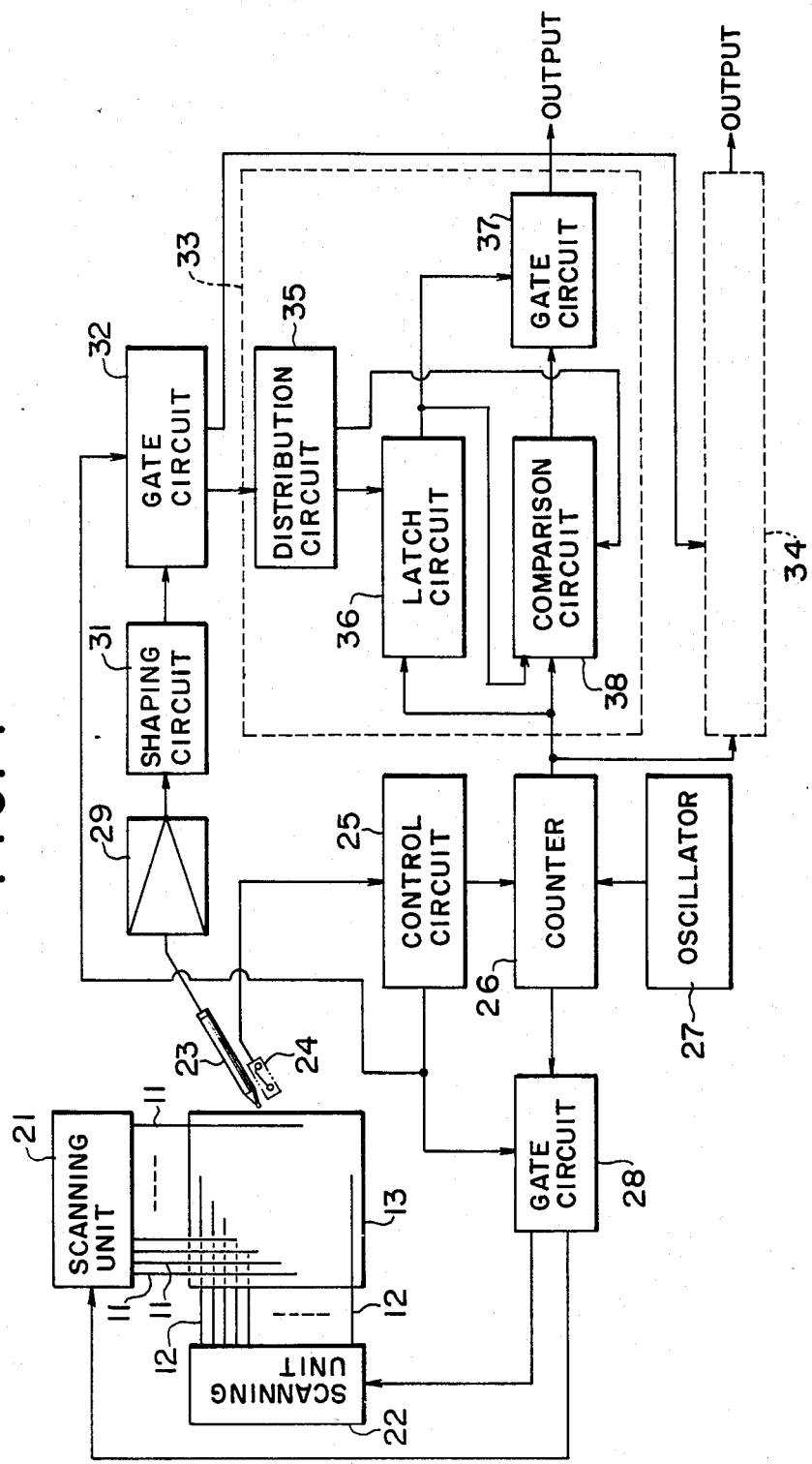
FIG. 1 is a block diagram showing one embodiment of a tablet input apparatus in accordance with the present invention.
Figure 2:
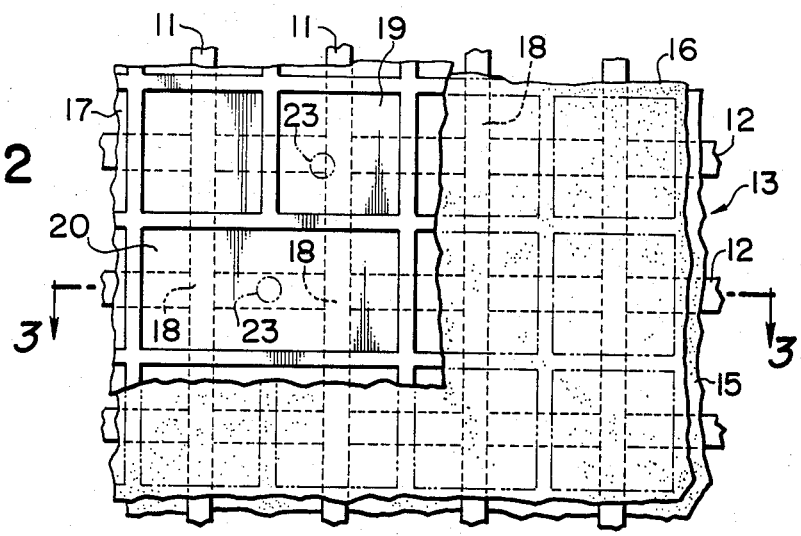
FIG. 2 is a plan view showing a part of the tablet of FIG. 1 in an enlarged scale, said part being cutaway.
Figure 3:
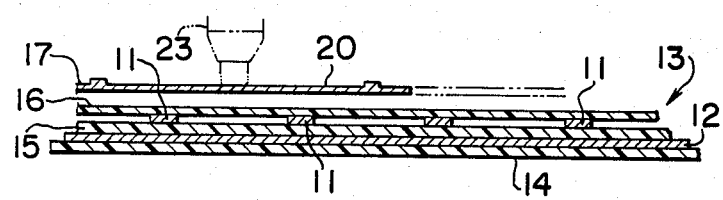
FIG. 3 is a sectional view taken along line 3—3 of FIG. 2.

Referring to FIG. 1, there is shown a tablet 13 having a group of conductors disposed in spaced relation in a direction of the X axis and a group of conductors disposed in spaced relation in a direction of the Y axis. This tablet 13 comprises, as shown in FIGS. 2 and 3, a group of plural conductors 11 arranged on a lower insulating sheet 14 in spaced relation in the direction of the X axis, and a group of plural conductors 12 arranged on an intermediate insulating sheet 15 provided on said group of conductors 11 in spaced relation in the direction of the Y axis. An information sheet 17 is provided on the group of conductors 12 through an upper insulating sheet 16. The information sheet 17 has a plurality of display segments printed thereon which defines a lattice point 18 formed by a single conductor 11 and a single conductor 12 as one key segment. Such a tablet is well known from the aforesaid U.S. Pat. Nos. 3,974,332, 4,194,083, etc., and therefore, the detailed description therefor will be omitted. In the illustrated embodiment, there is provided an enlarged display segment 20 having an area twice that of the display segment 19 and having two lattice points 18, 18 in order to display functions, phrases or the like out of information displayed on the information sheet 17.

Turning again to FIG. 1, the groups of conductors 11 and 12 are connected to output terminals of scanning units 21, 22, respectively, to sequentially supply scanning pulses from these scanning units 21, 22. An input pen 23 for designating display segment 19 or 20 houses therein an ON-OFF switch 24 which is actuated by contact of the input pen with the tablet 13. The ON-OFF switch 24 is connected to an input terminal of a control circuit 25. An output terminal of the control circuit 25 is connected to a control input terminal of a counter 26, and the control circuit 25 controls, by the output signal thereof, the start of the counting operation of the counter 26 and the supply of control signals to the scanning units 21, 22. An operation input terminal of the counter 26 is connected to an output terminal of an oscillator 27 to count oscillation pulses from the oscillator 27. An output terminal for outputting counting signals of the counter 26 is connected to the other input terminal of a gate circuit 28, one input terminal of which is connected to an output terminal of the control circuit 25. The gate circuit 28 controls, by the output signal of the control circuit 25, so as to apply the count content or counted value of the counter 26 in two by two periods to the scanning unit 21 or 22. The scanning units 21, 22 convert in symbol counted signals applied from the counter 26 through the gate circuit 28 to sequentially apply scanning pulses to each of the groups of conductors 11 and 12 of the tablet 12.

Assume now that the input pen 23 is placed in contact with the display segment 19. Then, when a scanning pulse is applied from the scanning units 21 or 22 to the groups of conductors 11 or 12 associated with the display segment, capacitive coupling between the input pen 23 and tablet 12 causes detection of the scanning pulse. The output terminal of the input pen 23 is connected to the input terminal of a shaping circuit 31 through an amplifier 29. That is, a detection signal obtained from the input pen 23 is amplified by the amplifier, after which it is shaped in waveform at a predetermined threshold value in the shaping circuit 31. The output terminal of the shaping circuit 31 is connected to one input terminal of a gate circuit 32. The other input terminal of the gate circuit 32 is connected to the output terminal of the control circuit 25. The gate circuit 32 carries out the operation corresponding to the aforesaid gate circuit 28 under the control of the control circuit 25. That is, the gate circuit 32 has one output terminal connected to an input of an X axis coordinate information generator section 33 and the other output thereof connected to an input of a Y axis coordinate information generator section 34 so that while the gate circuit 28 is connected to the scanning unit 21, the output of the shaping circuit 31 is applied to the X axis coordinate information generator section 33 whereas while the gate circuit 28 is connected to the scanning unit 22, the output of the shaping circuit 31 is applied to the Y axis coordinate information generator section 34. The X axis and Y axis coordinate information generator sections 33 and 34 have exactly same structure, and the X axis coordinate information generator sectionn 33 will be described hereinafter.

The X axis coordinate information generator section 33 comprises a distribution circuit 35, the input terminal of which is connected to one output terminal of the gate circuit 32. This distribution circuit 25 outputs, as a latch strobe signal, a first detection signal obtained by the first scanning of the group of conductors 11 on the X axis and outputs, as a comparing strobe signal, a second detection signal obtained by the second scanning thereof. The output terminal for outputting a latch strobe signal of the distribution circuit 35 is connected to an input terminal of the latch circuit 36. When entry of the latch strobe signal is made, the latch circuit 36 latches the counted value of the counter 26 at the timing thereof, i.e., the value representative of the coordinate of the display segment with which the input pen 23 is placed in contact to output data to the gate circuit 37. The output terminal of the latch circuit 36 is connected to each one input terminal of the gate circuit 37 and the comparison circuit 38. The other output terminal of the distribution circuit 35 is connected to one input terminal of the comparision circuit 38, and the output terminal of the comparison circuit 38 is connected to the other input terminal of the gate circuit 37. The output terminal of the counter 26 is connected to the respective other input terminals of the latch circuit 36 and comparison circuit 38. The comparison circuit 38 compares, at the timing when the comparison strobe signal from the distribution circuit 35 is inputted, the counted value of the counter 26 with the data latched by the latch circuit 36, and when they coincide, opens the gate circuit 37 to output the data of the latch circuit 36 as a proper coordinate data to the information processing device or the like which is connected to the output terminal of the gate circuit 37. This comparison operation is made so that the result of the coordinate data with which the input pen 23 is placed in contact is assured by scanning twice the group of conductors 11 to remove the influence resulting from noises or the like to enhance the reliability of the data input which has been heretofore carried out. The aforementioned operation may be carried out with respect to each of the groups of conductors 11 and 12 in the directions of X and Y axes to thereby output X and Y coordinate data concerning the coordinate region with which the input pen is placed in contact.

Next, the aforementioned distribution circuit 35 will be described in detail with reference to FIG. 4. The distribution circuit 35 comprises a distribution circuit body 41 and a distribution control circuit 42. The distribution circuit body 41 comprises first and second AND circuits 43, 44 connected so that a detection signal from the shaping circuit 31 is applied to first input terminals, respectively, through the gate circuit 32; a first flip-flop circuit 45 whose Q output terminal is connected to a second output terminal of the first AND circuit 43; and a second flip-flop circuit 46 whose Q output terminal is connected to a second input terminal of the second AND circuit 44. The first AND circuit 43 has its third input terminal connected to a $\overline{Q}$ output terminal of the second flip-flop circuit 46, and the second AND circuit 44 has its third input terminal connected to a $\overline{Q}$ output terminal of the first flip-flop circuit 45. The first flip-flop circuit 43 has its Q output terminal connected to a D input terminal of the second flip-flop circuit 44 and a $\overline{Q}$ output terminal connected to a D input terminal of the first flip-flop circuit 43. A clock signal input terminal of the first flip-flop circuit 43 is connected so that a detection signal from the gate circuit 32 is applied through a third AND circuit 51 of the distribution control circuit 42. The third AND circuit 51 has its output terminal connected to a clock signal input terminal of the second flip-flop circuit 46 through an inverter 47. Thus, the operation is made by the leading or front edge of the clock pulses of the first and second flip-flop circuits 45 and 46.

The distribution control circuit 42 comprises said third AND circuit 51, a third flip-flop circuit 53 having a clock pulse in synchronism with a scanning pulse of the scanning units 21, 22 applied to a clock signal input terminal thereof through an inverter 52, an exclusive logical sum circuit 54 having one input terminal connected to a Q output terminal of the third flip-flop circuit 53, a NAND circuit 55 hving the output terminal of the exclusive logical sum circuit 54 connected to one input terminal thereof, and a manual switch 56 having one output terminal connected to the other input terminal of the NAND circuit 55. The third AND circuit 51 has the other input terminal connected to the output terminal of the NAND circuit 55, and the exclusive logical sum circuit 54 has the other input terminal connected to the D input terminal of the third flip-flop circuit 53. The manual switch 56 is provided to provide a connection-changeover between a terminal applied with a supply voltage and a grounded terminal, and this switch is changed over to thereby apply a "HIGH" or "LOW" level signal to the NAND circuit 55. Likewise, the third flip-flop circuit 53 is actuated by the front edge of the clock pulse applied to the clock signal input terminal thereof.

Figure 4:
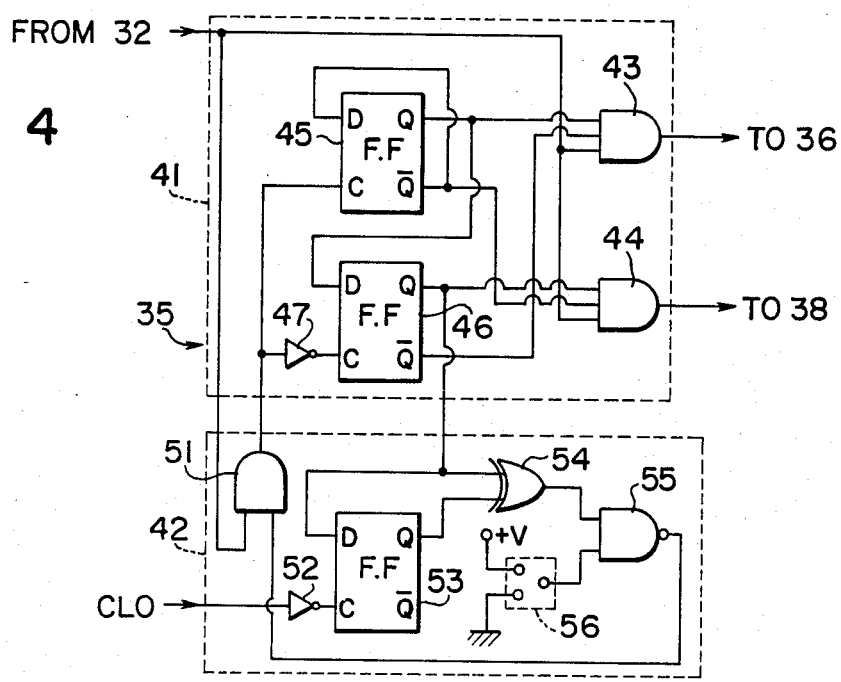
FIG. 4 is a circuitry representation showing the detail of a distribution circuit of FIG. 1.
Figure 5A:
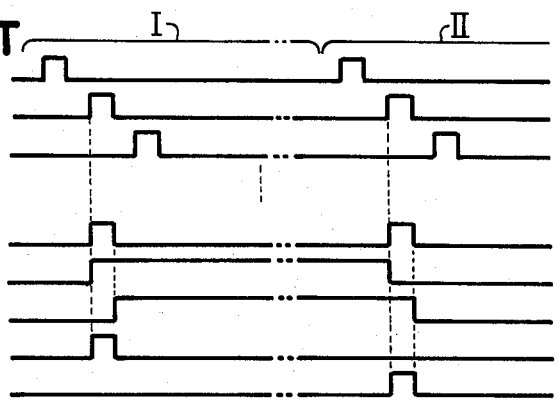
FIG. 5a and FIG. 5b are timing charts for explanation of operation of the distribution circuit in a conventional tablet input apparatus.

The above-described structures except the distribution control circuit 42 shown in FIG. 4 are well known in the conventional tablet input apparatus. That is, in the conventional tablet input apparatus, the gate circuit 32 has one output terminal thereof connected directly to the clock input terminal of the first flip-flop circuit 45 and connected to the clock input terminal of the second flip-flop circuit 46 through the inverter 47. Now, the detection of the coordinate data in the conventional tablet input apparatus as described will be described in connection with FIG. 5. Taking the group of conductors 11 in a Y-axis direction as an example, one cycle wherein a scanning pulse is sequentially applied to the $n^{th}$ conductor 11n from the scanning unit 21 in the order from the first conductor 11a, to the second conductor 11b, then to the third conductor 11c, is repeated twice. In FIG. 5a, I denotes a first cycle and II denotes a second cycle. Thus, two scanning pulses are applied to the respective conductors as shown in (1), (2) and (3) of FIG. 5a. When the input pen 23 is placed in contact with the display segment 19 to which the second conductor 11b belongs, and when the first scanning pulse is applied to the second conductor 11b, a first detection signal appears at the output terminal of the shaping circuit 31, and when the second scanning pulse is applied thereto, a second detection signal appears (FIG. 5a (4)). The first detection signal is applied to the clock input terminal of the first flip-flop circuit 45 through the gate circuit 32, and at the timing of the front edge thereof, the $\overline{Q}$ output terminal of said circuit 45 which has been at HIGH level assumes LOW level, and the Q output terminal assumes HIGH level. (FIG. 5a (5)). On the other hand, in the second flip-flop circuit 46, the Q output terminal thereof assumes HIGH level as shown at the timing of FIG. 5a (6) in the rear edge of the first detection signal by the inverter 47. Thus, all the inputs of the first AND circuit 43 assume HIGH level, that is, "1", and a single output signal appears as shown at FIG. 5a (7) in the output of the AND gate 43, and the first detection signal related to the scanning pulse in the first cycle is put out from the first AND circuit 43. When the second detection signal is put into the distribution circuit by the scanning pulse in the second cycle, the first flip-flop circuit 45 is inverted by the front edge thereof with the result that the Q output terminal thereof assumes LOW level and the $\overline{Q}$ output terminal thereof assumes HIGH level. In the second flip-flop circuit 46, said circuit is inverted by the timing of the rear or trailing edge with the result that the Q output terminal assume LOW level. Accordingly, as shown in FIG. 5a (8), a single output signal appears at the output terminal of the second AND gate 44, and the second detection signal related to the scanning pulse in the second cycle is put out from the second AND circuit 44.

As described above, in case the input pen 23 is placed in contact with the display segment 19 of the tablet 13, only one detection signal is obtained in the first cycle, said detection signal is put out from one AND gate circuit, whereas one detection signal obtained in the second cycle is put out from the other AND circuit so that it is possible to discriminate the coordinate data wherein the counted value of the counter 26 subjected to data latching and the counted value of the counter 26 compared coincide. However, in case the input pen is placed in contact with the enlarged display segment 20 having an area twice that of the display segment 19, the detection fails to be made depending on the portion with which the pen is placed in contact.

Figure 5B:
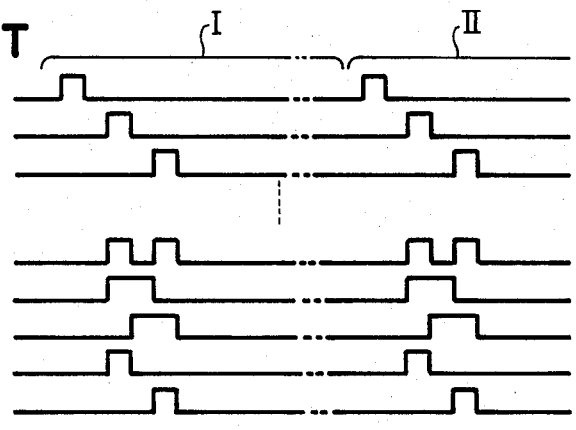

The case where the enlarged display segment 20 includes the conductors 11b and 11c in the X-axis direction will be described hereinafter. When the input pen 23 is placed in contact with the central portion of the enlarged display segment 20, the input pen 23 will detect the scanning pulse applied to the conductor 11b as well as the scanning pulse applied to the conductor 11c. Therefore, two pulses as shown at FIG. 5b (4) appear in the output terminal of the shaping circuit 31 by the scanning pulse in the first cycle. Because of these two pulses, the Q output terminal of the first flip-flop circuit 45 is inverted to LOW level by the front edge of the scanning pulse of the conductor 11c, and the Q output terminal of the second flip-flop circuit 46 is also inverted to LOW level by the rear edge of the scanning pulse of the conductor 11c. (FIG. 5a, (5) and (6)). Therefore, the detection signal resulting from the scanning pulse of the conductor 11b appears at the output of the first AND gate circuit 43 and the detection signal resulting from the scanning pulse of the conductor 11c appears at the output of the second AND circuit 44. At this time, the counted value of the counter 26 subjected to data latching is different from the counted value of the counter 26 compared and thus no coincidence therebetween is made. As a consequence, the input of the coordinate data is rendered impossible, and despite the fact that the input pen is properly placed in contact with the central portion of the enlarged display segment 20, there occurs a non-detection zone between the coordinate regions of the tablet.

Such an inoperable condition may be prevented by the distribution control circuit 42 of the prevent invention. The operation of the distribution control circuit 42 will be described with reference to FIG. 6. In a normal case where the input pen 23 is placed in contact with the display segment 19, the manual switch 56 is changed-over to the earth side from a position shown in FIG. 4. If the Q output terminals of all the flip-flop circuits 45, 46, 53 are preset to LOW level, that is, "0", the "0" of the Q output terminal of the second flip-flop circuit 46 is applied to one input terminal of the exclusive logical sum circuit 54 whereas the "0" of the Q output terminal of the third flip-flop circuit 53 is applied to the other input terminal thereof, whereby the output terminal of said circuit 54 also assumes "0". On the other hand, the output of the manual switch 56 is also "0", and the output of the NAND circuit 55 assumes HIGH level, "1", by said two "0" signals, and the third AND circuit 51 provides the "1" signal at the output terminal thereof at every arrival of the scanning pulse. Accordingly, if the input pen 23 is placed in contact with the normal display segment 19, the distribution circuit body 41 operates similarly to the above-mentioned conventional distribution circuit and the fully coincided first and second detection signals are put out to the latch circuit 36 and comparison circuit 38.

Figure 6:
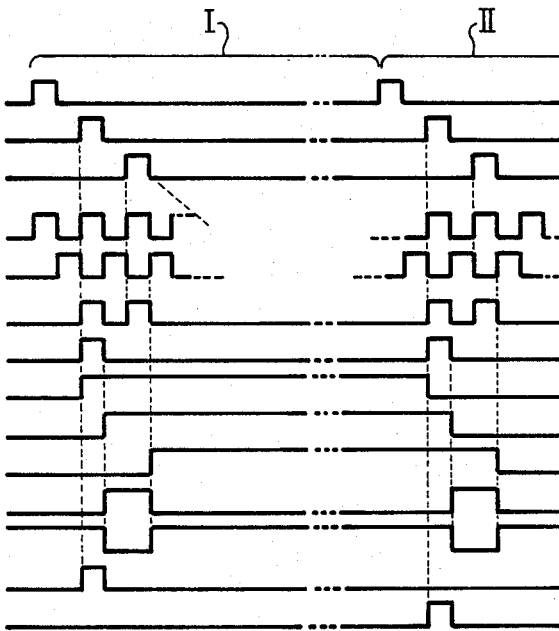
FIG. 6 is a timing chart for explanation of operation of the distribution circuit of FIG. 4.

Next, the case where the coordinate data of the enlarged display segment 20 is extracted will be described. In this case, the manual switch 56 is changed-over to the power supply as shown in FIG. 4 to put out HIGH level, i.e., "1". In this state, when the operator places the input pen 23 in contact with the enlarged display segment 20, the input pen detects the scanning pulses applied to the conductors 11b and 11c as described above, and the shaping circuit 31 detects two scanning signals as shown in FIG. 6 (6). Even if the "1" appears at the input terminal of the switch 56 of the NAND circuit 55, the output of the exclusive logical sum circuit 54 is "0", and therefore, the output of the NAND circuit 55 maintains "1". Thus, the first detection signal from the shaping circuit 31 is delivered as a latch strobe signal to the latch circuit 36 passing through the first AND circuit 43 (FIG. 6 (13)). When the Q output terminal of the second flip-flop circuit 46 assumes HIGH level, the output of the exclusive logical sum circuit 54 also assumes HIGH level whereas the output of the NAND circuit 55 assumes LOW level. Thus, one input terminal of the third AND circuit 51 is LOW level and thus, even if the second detection signal is applied from the shaping circuit 31 to the third AND circuit 51, the second detection signal is rendered ineffective since the output of the AND circuit 51 is LOW level as shown in FIG. 6 (7) with the result that the output to the distribution circuit body 41 is impaired. On the other hand, the front edge of the first detection signal causes the Q output terminal of the second flip-flop circuit to assume HIGH level, which is applied to the D input terminal of the third flip-flop circuit 53. Thus, the flip-flop circuit 53 is inverted and the Q output terminal thereof assumes HIGH level by the clock pulse inputted into the third flip-flop circuit 53 through the inverter 52 at the timing of the rear edge of the second detection signal. Thus, after the rise of the second detection signal, the output of the exclusive logical sum circuit 54 assumes LOW level and the output of the NAND circuit 55 assumes HIGH level (FIG. 6 (12)). Thereby, when the third detection signal detected by the input pen 23 through the scanning in the second cycle is inputted into the distribution circuit 35, the first flip-flop circuit 45 is inverted at the timing of the front edge thereof and the Q output terminal thereof assumes LOW level, and the second flip-flop circuit 46 is inverted at the timing of the rear edge of the third detection signal and the Q output terminal thereof assumes LOW level. Therefore, the third detection signal passes through the second AND circuit 44 and is delivered as a comparison strobe signal to the comparision circuit 38.

Accordingly, the comparison circuit 38 takes the coincidence exactly similarly to the aforementioned conventional tablet input apparatus, and the data latched by the latch circuit 36 is outputted as a correct coordinate data. When the Q output terminal of the second flip-flop circuit 46 assumes LOW level, the output of the exclusive logical sum circuit 54 assumes HIGH level and the NAND circuit 55 assumes LOW level accordingly. Thus, the application of the fourth detection signal in the second cycle into the distribution circuit body 41 is impaired. The third flip-flop circuit 53 is inverted at the rising timing of the fourth detection signal and the Q output terminal thereof assumes LOW level whereby the the logical state of the circuit is returned to its original state.

With the aforesaid operation, even if two detection signals related to the adjacent coordinate regions are inputted, the data latching and data comparison are carried out on the basis of only the detection signal related to one coordinate region. Accordingly, it is possible to always positively input one coordinate data and as a result, it is possible to remove the non-detection zones between the coordinate regions to provide an input zone. In the above-described embodiments, the coordinate input is carried out on the basis of a signal first detected out of two detection signals obtained by the scanning in one cycle but it is noted that the coordinate input can be made on the basis of a signal detected afterwards. In this case, for example, the inital setting of the flip-flop circuits may be made reversely to that of the aforesaid embodiments.

What is claimed is:

1. A tablet input apparatus comprising:

a tablet comprising a matrix having two sets of a group of conductors arranged in spaced relation along coordinate axes to define a plurality of lattice points, and a segment including at least one of the lattice points of said matrix, said segment being, as a separate key, associated with a symbol representative of said key;

a pair of scanning units respectively connected to said two sets of a group of conductors to sequentially supply scanning pulses to said each set of a group of conductors;

an input pen for detecting said scanning pulses from the desired said segment of said tablet and producing corresponding scanning pulse detection signals; and control circuit means for supplying a control signal to each of said pair of scanning units and for receiving the scanning pulse detection signals from said input pen thereby to specify said segment selected by said input pen to output a coordinate data signal, said control circuit means including a distribution control circuit operative when said input pen is placed in contact with a segment having at least two lattice points to detect scanning pulses supplied to at least two said conductors adjacent to said input pen to render at least one of the scanning pulse detection signals ineffective in specifying the selected segment, said distribution control circuit comprising a logical circuit actuated in cooperation with said control signal for controlling the passing of the scanning pulse detection signals.

2. The tablet input apparatus of claim 1 wherein said distribution control circuit includes a manual switch, and when said switch is changed-over to thereby place said input pen in contact with said segment having at least two lattice points, at least one of the scanning pulse detection signals is rendered ineffective.

3. The tablet input apparatus of claim 1 wherein said distribution control circuit further comprises a flip-flop circuit controlled by an external input signal in synchronism with said control signal, the output signal of said flip-flop circuit and said control signal cooperating to control said logical circuit.

* * * * *